United States Patent Office 3,561,930
Patented Feb. 9, 1971

3,561,930
SEPARATION OF CALCIUM SULPHATE HEMIHYDRATE BY A HEATED CENTRIFUGE
Martin Granger Brown and Edward Graham Foster, Norton-on-Tees, England, assignors to Imperial Chemical Industries Limited, London, England, a corporation of Great Britain
Filed Apr. 24, 1967, Ser. No. 633,176
Claims priority, application Great Britain, May 27, 1966, 23,847/66
Int. Cl. B01d 9/02; C01f 11/46
U.S. Cl. 23—293                                   4 Claims

ABSTRACT OF THE DISCLOSURE

Method for the separation of a hydraulic binding material, e.g. calcium sulphate hemihydrate, from water. The method involves centrifuging an aqueous slurry of the binding material in a centrifuging zone and removing the separated moist solid material and the separated water from different parts of the zone, at least one surface upon which the separated moist solid material is liable to be deposited being heated to a temperature which is at least 100° C. and at which hydration of the material is substantially prevented. Apparatus for carrying out the method is also described.

Figure 1:
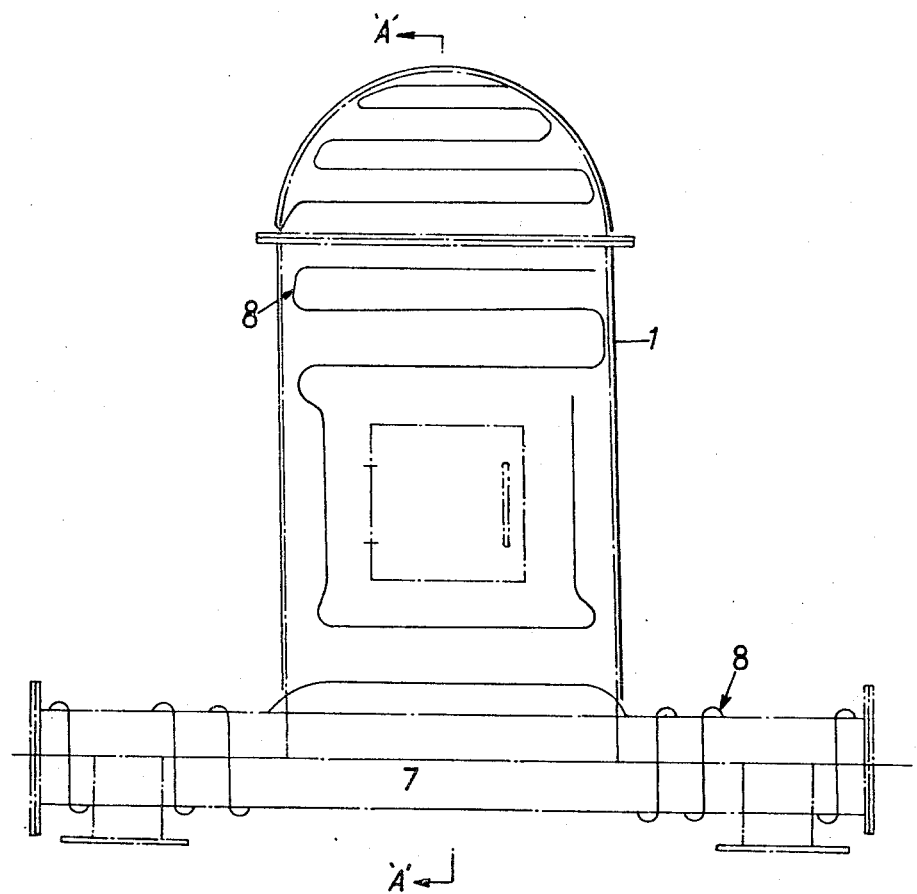

This invention relates to the separation from water of a hydraulic binding material, i.e. a material which sets hard by hydration, such as for example plaster, stucco, plaster of Paris etc. The invention is especially suitable to the separation from water of calcium sulphate hemihydrate ($CaSO_4 \cdot \frac{1}{2}H_2O$), which by the action of water is converted to, and sets hard as, gypsum ($CaSO_4 \cdot 2H_2O$).

Simple filtration of aqueous slurries of calcium sulphate hemihydrate is highly unsatisfactory, since the hemihydrate tends to hydrate and set even while filtration is proceeding, with consequent blinding of the filter media. The separation of water from solid hemihydrate is, in practice, best effected by means of a continuous decanting centrifuge process, but even so the discharge of the moist solid hemihydrate from the centrifuge is hampered by its tendency to adhere to and set upon the centrifuge casing and associated discharge equipment such as hoppers and screw conveyors. The result is that the discharge of the solid is progressively retarded, and finally prevented, by the blocking of the aperture or apertures through which the discharge occurs.

We have now found that these serious disadvantages can be avoided if the surfaces upon which the moist hemihydrate is liable to be deposited are heated to a temperature above the boiling point of water, which is also, incidentally, above the temperature at which the hydration of hemihydrate to gypsum can occur. By heating these surfaces above the boiling point of water, the moist hemihydrate is prevented from adhering to and setting upon the heated surfaces, and thus the formation and bridging of cake is prevented. Heating the centrifuge surfaces prevents adhesion thereto of hemihydrate particles by boiling off the moisture from the surface of any hemihydrate mass which comes into contact with the centrifuge surfaces; a vapour cushion is thus formed over the area of contact which repels the hemihydrate particles. Any hemihydrate particles which succeed in sticking to the centrifuge surfaces are prevented from hydrating and setting by the temperature which is above that at which the hydration reaction can take place.

The present invention accordingly provides a method for the separation from water of a hydraulic binding material, which includes the step of heating a surface or surfaces upon which the separated moist solid material is liable to be deposited to a temperature of at least 100° C. or to at least a temperature at which hydration of the material cannot take place, whichever is the higher.

The heating may be effected in a variety of ways, for example by high pressure steam or hot oil, or electrically, or by radiant heating. In the case of hemihydrate, the surfaces should be heated to a temperature at least within the range of 100° C. to 120° C. but we prefer to heat them to higher temperatures, for example to temperatures of the order of 250° C.

The invention further provides apparatus for the separation from water of a hydraulic binding material, which includes means for heating a surface or surfaces upon which the separated moist material is liable to be deposited to a temperature of at least 100° C. or to at least a temperature at which hydration of the material cannot take place, whichever is the higher.

Figure 2:
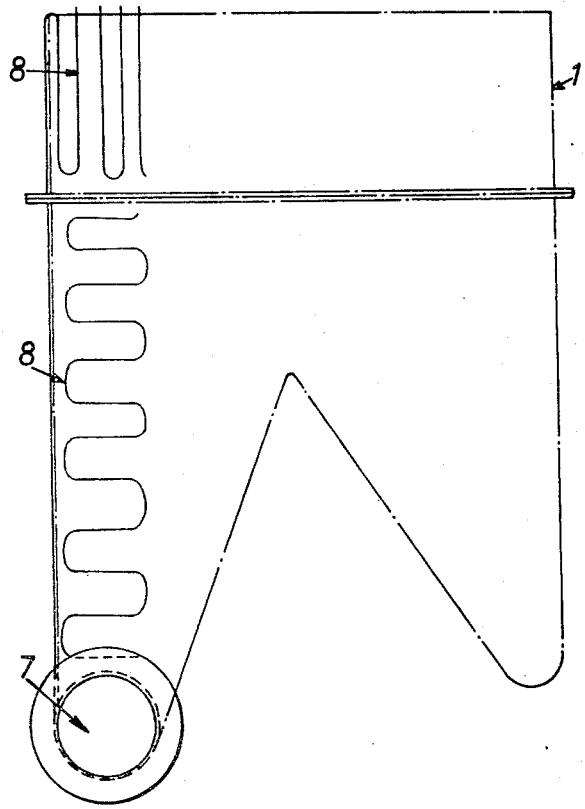
Figure 3:
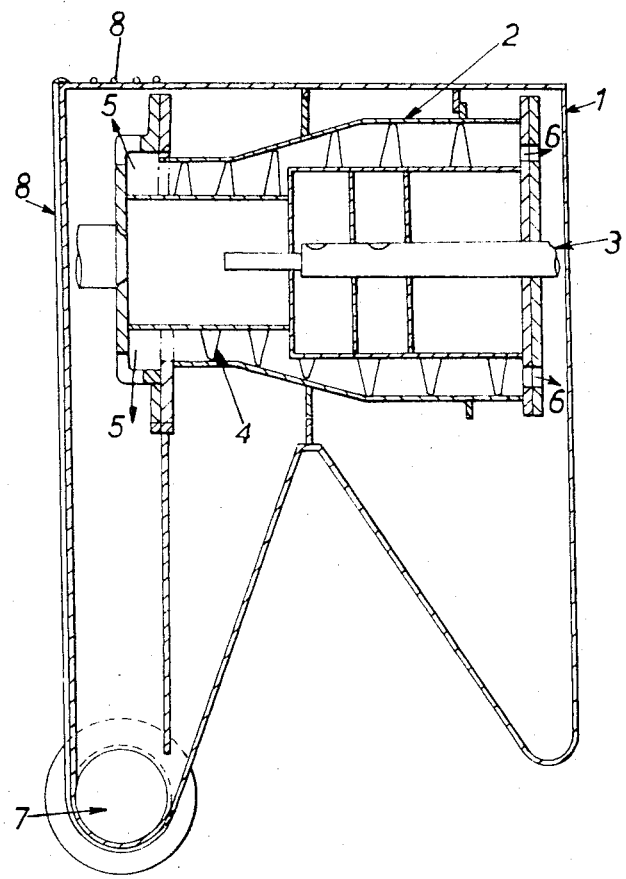

A suitable apparatus of known kind for carrying out the invention is a solid bowl continuous decanting centrifuge as illustrated in the drawings accompanying the provisional specification, wherein FIG. 1 and FIG. 2 are, respectively, a front and side elevation of the centrifuge, and FIG. 3 is a section along the line A—A of FIG. 1.

The centrifuge illustrated comprises an outer casing 1 and a rotating inner bowl 2 into which an aqueous slurry is introduced through a slurry inlet 3, and centrifugal action effectively separates the solids content of the slurry from the water. A scroll 4 rotates within the bowl 2, and transports the solids from the bowl to a solids outlet 5 at the far end of the centrifuge. The water or discharge liquor is discharged from the bowl through a liquid outlet 6 at the near end of the centrifuge, that is to say the end adjacent the slurry inlet 3. The solids may be discharged through the solids outlet 5 into, for example, a screw conveyor 7. In general, this kind of contrifuge works very well, except that the solids tend to be deposited on the interior of the casing at the far end of the centrifuge, in and around the solids outlet 5, and in the screw conveyor 7, and if the solid happens to be calcium sulphate hemihydrate it will set as gypsum in these locations, progressively retarding and finally preventing the discharge of solids from the centrifuge.

According to our invention, we overcome this disadvantage by heating the casing 1, particularly the far end thereof adjacent the solids outlet 5, and preferably also the screw conveyor 7, to a temperature at least within the range 100° C. to 120° C. and preferably to a temperature of at about 250° C. This is most conveniently done by applying to the exterior of the casing and screw conveyor a number of electric heating elements 8 as represented by solid lines in FIGS. 1 and 2. Among suitable alternative forms of heating there may be mentioned steam, hot oil, and radiant heating. In either case, the formation of gypsum cake is prevented since the moist hemihydrate is prevented from adhering to and setting upon the heated surfaces of the centrifuge.

Heating of the centrifuge can be assister, and scaling substantially prevented, by carrying out at least a part of the centrifuging process in a saturated steam atmosphere. Steam may be injected directly into the centrifuge or into a part thereof, or if the hemihydrate has been made by the continuous autoclave process described and claimed in our British Pat. No. 1,051,849, steam may be blown-off into the centrifuge or into a part thereof from the autoclave let-down means. Maintaining a saturated steam atmosphere is particularly useful to prevent scaling at or near the liquid outlet 6, particularly if the adjacent centrifuge wall is not heated. By operating this part of the centrifuge in a steam atmosphere saturated at about 90° C., the discharge liquor is prevented from evaporating and depositing a gypsum scale. The use of a saturated steam atmosphere is less useful or necessary at or near the solids outlet 5, and we therefore do not exclude the possibility of using a saturated steam atmosphere only at the near end of the centrifuge, that is to say the end adjacent the liquid outlet 6.

We claim:

1. In a method for separatingg calcium sulphate hemihydrate particles from water by centrifuging an aqueous slurry of the particles in a centrifuging zone and removing the separated moist solid material and the separated water from different parts of said zone, the improvement which comprises heating at least one surface upon which the separated moist solid material is liable to be deposited to a temperature from above 120° C. to about 250° C. at which temperature the hemihydrate particles are substantially repelled from said surface by the formation of a vapor cushion over said surface.

2. A method as in claim 1 wherein said surface is heated to about 250° C.

3. A method as claimed in claim 1, wherein at least the removal of the separated water from said zone is effected in a saturated steam atmosphere.

4. A method as claimed in claim 1, wherein said surface is heated by the application to its exterior of at least one electric heating element.

References Cited

UNITED STATES PATENTS

| 541,573 | 6/1895 | Selwig | 210—179 |
|---|---|---|---|
| 757,649 | 4/1904 | Brothers | 23—304X |
| 2,435,023 | 1/1948 | Van Riel | 210—179 |
| 2,688,405 | 9/1954 | Sharples | 210—179 |
| 3,207,627 | 9/1965 | Dietzel et al. | 210—78X |
| 3,377,020 | 4/1968 | Piper | 233—11 |
| 3,423,172 | 1/1969 | Cafferata | 23—122 |
| 3,489,583 | 1/1970 | Bloom et al. | 23—122 |

NORMAN YUDKOFF, Primary Examiner

R. T. FOSTER, Assistant Examiner

U.S. Cl. X.R.

23—122, 304; 233—11